March 23, 1954  R. F. BLATTNER  2,672,797
FILM MEASURING AND DOUBLE EXPOSURE PREVENTION DEVICE
Filed Feb. 14, 1951  2 Sheets-Sheet 1
FIG. 3.
FIG. 1.
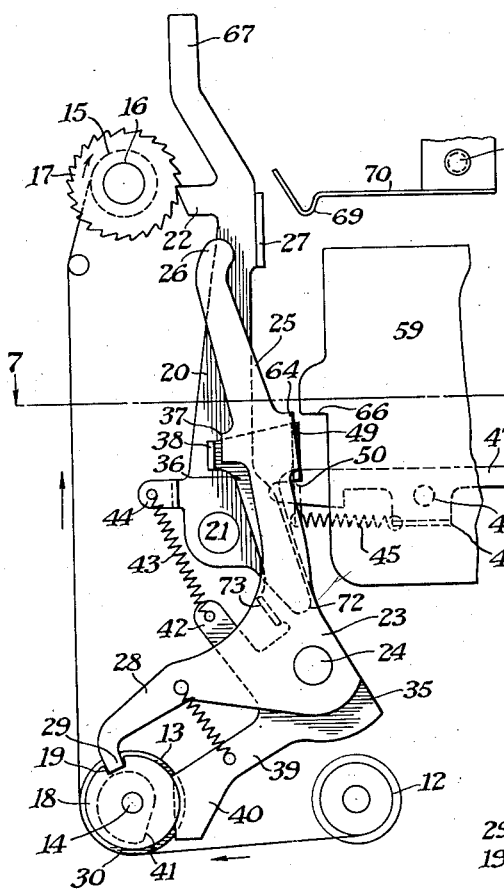
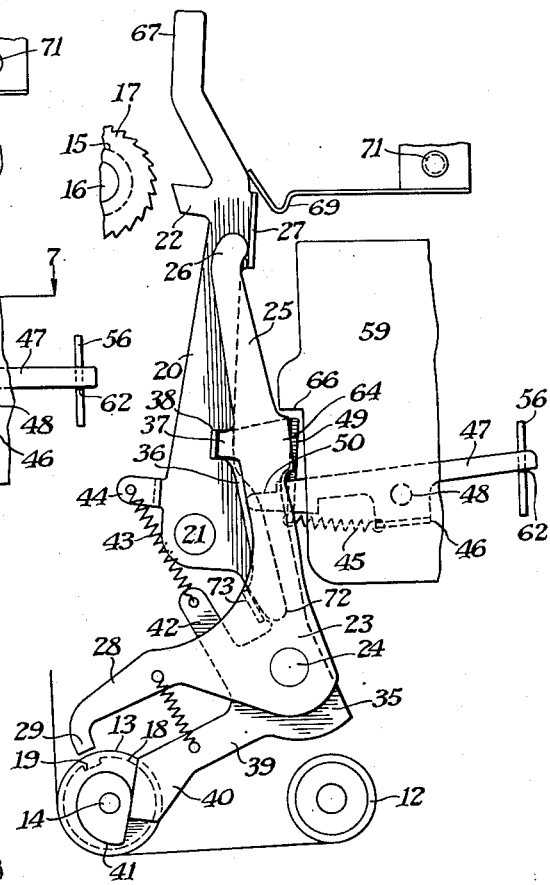
FIG. 7.
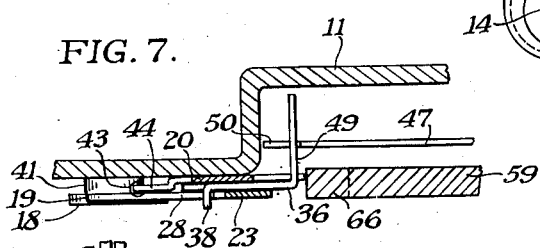
FIG. 8.
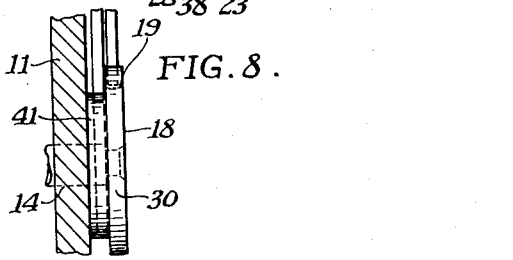
ROBERT F. BLATTNER
Inventor
By Daniel J. Mayne
J. Griffin Little
Attorneys March 23, 1954 R. F. BLATTNER 2,672,797
FILM MEASURING AND DOUBLE EXPOSURE PREVENTION DEVICE
Filed Feb. 14, 1951 2 Sheets-Sheet 2
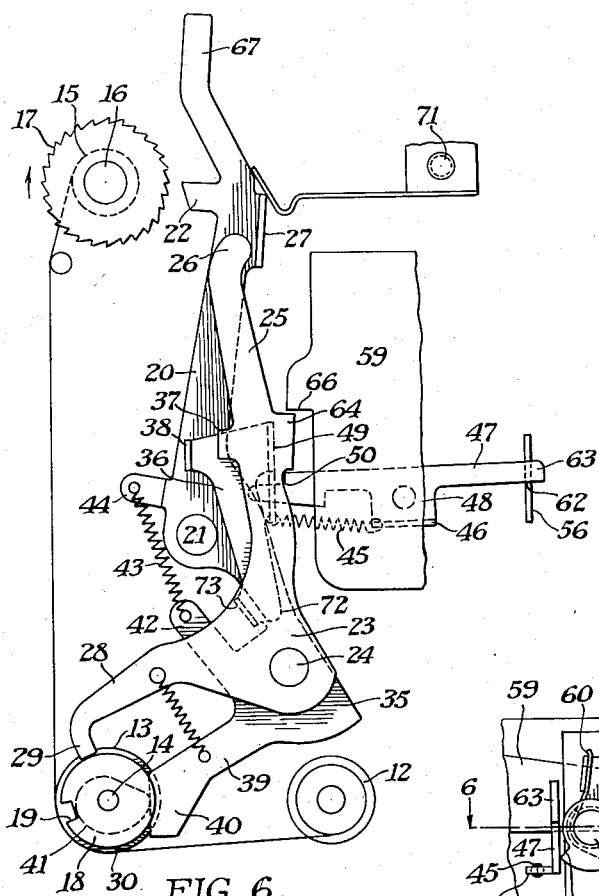
ROBERT F. BLATTNER
Inventor Patented Mar. 23, 1954

2,672,797

UNITED STATES PATENT OFFICE 2,672,797

FILM MEASURING AND DOUBLE EXPOSURE PREVENTION DEVICE

Robert F. Blattner, Rochester, N. Y., assignor to Eastman Kodak Company, Rochester, N. Y., a corporation of New Jersey Application February 14, 1951, Serial No. 210,977

1 Claim. (Cl. 95—31)

The present invention relates to roll film cameras, and more particularly to a film metering and double exposure prevention device for such cameras.

As is well known, in cameras of this type, it is desirable to provide a device which will lock the film winding mechanism automatically at the end of each winding operation. After the exposure has been made, it is necessary to release the previously locked winding mechanism so that the exposed image area may be wound up onto the take-up spindle. In addition, it is desirable to provide an interlock between the shutter actuating mechanism and the film winding mechanism so that the shutter cannot be actuated a second time until the exposed film has been wound. Accordingly, the present invention provides an arrangement by which the locking of the film winding mechanism at the end of the film winding operation serves to unlock the shutter actuating mechanism so that the exposure may be made. The operation of the shutter then serves to unlock the film winding mechanism, and simultaneously lock the shutter actuating mechanism.

The present invention has as its principal object the provision of a novel and effective double exposure prevention device, and a film winding and measuring mechanism.

A still further object of the invention is the provision of a device of the class described which is easy to operate, and automatic and positive in its action.

And another object of the invention is the provision of an arrangement by which the film winding mechanism may be released selectively and independently of the shutter actuating mechanism to permit the making of a deliberate double exposure or the winding of the trailer and leader strips.

Another object of the invention is the provision of an arrangement for maintaining the control parts in a definite phased relation during the winding of the trailer and leader strips.

To these and other ends, the invention resides in certain improvements and combinations of parts, all as will be hereinafter more fully described, the novel features being pointed out in the claim at the end of the specification.

In the drawings:

Fig. 1 is a side elevation view of the double exposure prevention device of the present invention, showing the relation of the parts after an exposure has been made, with the shutter locked and the winding mechanism released;

Fig. 2 is a view similar to Fig. 1, but showing the relation of the parts at a point during the film winding operation.

Fig. 3 is a view similar to Figs. 1 and 2, but showing the relation of the parts at the end of the film winding operation, with the shutter released and the film winding mechanism locked;

Fig. 4 is a partial view of the mechanism illustrated in Figs. 1–3, showing the position of one of the members during the loading operation or while making a deliberate double exposure;

Fig. 5 is a front view of the shutter, showing the connection between the shutter and the double exposure prevention device;

Fig. 6 is a horizontal sectional view taken substantially on line 6—6 of Fig. 5, but on a larger scale than the latter, showing the relation of the parts;

Fig. 7 is a horizontal sectional view taken substantially on line 7—7 of Fig. 3 showing the relation of the member for controlling the release of the winding mechanism from the shutter; and Fig. 8 is a side elevation view of the two cams mounted on the measuring shaft.

Similar reference numerals throughout the various views indicate the same parts.

The drawings show a camera body or support 11 on which the various mechanisms of the present invention are mounted. The film is unwound from a supply spool 12 and is passed over a measuring roll 13 mounted on a measuring roll shaft 14. The film is then passed over an exposure aperture, and is finally wound up on a take-up spool 15, the spindle 16 of which has mounted thereon a ratchet 17. The shaft 14 has mounted thereon a cam 18 provided with a radially extending open end slot 19, the purpose of which will be later described. The cam 18 is of such size that it will make exactly one revolution when the film has been moved to distance of one image area. The structure so far described does not, per se, from a part of the present invention, and further details are not deemed necessary to those familiar with the art.

A member 20 is pivoted at 21 on the body 11 and is formed with a pawl 22 which is adapted to engage the ratchet 17 when the member 20 is rocked in a counter-clockwise direction to lock the winding spindle 16 and spool 15 against further rotation. In order that the locking of the ratchet 17 will occur only at the end of the film winding operation, the present invention provides an arrangement for holding the member 20 positively out of arrangement with the ratchet 17 until the exposed image area has been wound up completely. To secure this result, a bellcrank 23 is pivotally mounted at 24 on the camera body, and is formed with an arm 25 the free end 26 of which is positioned to engage an upturned lug or ear 27 on member 20 to hold the latter in its inoperative position, shown in Fig. 1. Thus, the bellcrank 23 may be considered as a blocking member or means for member 20. The bellcrank 23 is formed with a second arm 28 the free end of which is formed with a lug 29 which is adapted to engage and ride on the surface 30 of the cam 18.

A second bellcrank 35 is positioned under the bellcrank 23 and is also pivoted on the pivot point 24. This second bellcrank 35 is provided with an upper arm 36 which underlies the arm 25 of bellcrank 23, as shown in Figs. 1–3. The arm 36 is formed with an upturned lug or member 38 which is positioned in the path of a laterally projecting lug 37 extending from the left side of arm 25, as best shown in Figs. 1–3. It is apparent from an inspection of Fig. 1 that so long as the bellcrank 35 remains in the position shown in Fig. 1, the lug 38 will constitute a blocking means to hold the bellcrank 23 in the position shown in this figure. In this position the pawl 22 is out of holding relation with ratchet 17 and the lug 29 is maintained out of contact with periphery 30 so that the winding mechanism is free and may be operated to wind the film. The second bellcrank 35 is formed with a lower arm 39 the free end of which is provided with a cam follower 40 which engages a second cam 41 carried by shaft 14 and positioned beneath cam 18, as best shown in Fig. 8. The bellcrank 35 is formed with a third arm 42 which is connected by a coil spring 43 to a lug 44 on member 20. A second coil spring 45 has one end connected to the arm 36 above pivot 24, and the other end is connected to a lug 46 formed on a lever 47, which is pivoted at its midpoint 48, all as shown in Figs. 1–3.

With the parts in the position illustrated in Fig. 1, the film winding mechanism is free and the spindle 16 may be rotated to move the film and to wind the latter onto the take-up spool 15. Such winding serves to rotate shaft 14 and the cams 18 and 41 as a unit therewith and in timed relation with the movement of the film. The spring 45 serves to hold the follower 40 in positive engagement with the cam 41. During the initial winding of the film, the cam 41 will be rotated from the position shown in Fig. 1 towards the position shown in Fig. 2. Such rotation will impart a gradual counter-clockwise movement of bellcrank 35 about its pivot 24 to move the lug 38 of arm 36 out of holding or blocking relation with lug 37 on arm 35 to free bellcrank 23. Such movement of bellcrank 35 will serve to stretch or tension both springs 43 and 45. When the lug 37 has been moved away from lug 38, the spring 43 will impart a slight counter-clockwise movement both to member 20 and bellcrank 23 to move the lug 29 of arm 28 into engagement with the periphery 30 of cam 18. The parts may then be in position as shown in Fig. 2. When the bellcrank 35 reaches substantially the position illustrated in Fig. 2, a downturned lug 49 on the arm 36 drops behind a shoulder 50 formed on the left end of lever 47, which tends to turn in a clockwise direction under the action of spring 45, to hold the bellcrank 35 in its locked or non-locking position.

Continual winding of the film will cause shaft 14 and cams 18 and 41 to rotate as a unit. When the exposed image area has been wound up completely, the cam 18 will have been rotated to a point at which the slot 19 will be moved into registry with lug 29 whereby the latter will drop into slot 19 under the action of spring 43 acting through member 20. Such action will impart a counter-clockwise rotation to bellcrank 23 to move the end 26 thereof out of holding relation with the lug 27 of member 20 to free the latter, which then rocks counter-clockwise under action of spring 43 to move pawl 22 into locking relation with ratchet 27. The parts are then in the position illustrated in Fig. 3, and the exposed image area has been wound and the winding mechanism is held or locked against further rotation. Thus, the film winding mechanism is locked automatically at the end of the film winding operation and when the exposed film has been wound up completely.

The film feeding mechanism and the various parts may be released manually from their locking position and returned to their inoperative position shown in Fig. 1. However, it is preferred to control the releasing of the winding mechanism from the shutter so as to prevent the winding of the film until after an exposure has been made. To this end, a shutter 55 and a shutter cover 56 are provided, the latter being pivoted at 57. As the shutter and cover are of well known construction, and do not, per se, form a part of the present invention, further details thereof are not deemed necessary. Suffice it to say that the shutter mechanism is provided with a release lever 58 which is connected to a shutter trigger 59 so that actuation of the latter will rock lever 58 about pivot 57 sufficiently to tension spring 60, and trip latch 61 to actuate the shutter. Such operation will cause cover 56 to rock in a clockwise direction to bring shoulder 62 thereon into engagement with end 63 (right hand view Figs. 1–3) of lever 47. Such engagement will impart a counter-clockwise rocking movement to lever 47 (as view Figs. 1–3) to cause shoulder 50 to be withdrawn from holding relation with lug 49 to free bellcrank 35.

The latter now moves clockwise under the action of the tensioned spring 45 to bring lug 38 into engagement with lug 37 also to rock bellcrank 23 in a clockwise direction to withdraw lug 29 out of slot 19. Such clockwise rotation of bell crank 23 causes end 26 to engage lug 27 to rock member 20 in a clockwise direction about its pivot 21 to withdraw pawl 22 out of holding or locking relation with ratchet 17 to free the film winding mechanism. Thus, the actuation of the shutter to make an exposure serves to release the winding mechanism. When the trigger 59 is released, it is returned to its inoperative position shown in Figs. 1–3. At this time the spring 45 serves to rock the bellcranks 23 and 35 slightly more to the right to bring lugs 64 and 49 on arms 25 and 36, respectively, under and in the path of a laterally projecting shoulder 66 on trigger 59 so as to prevent a second unintentional actuation of the trigger and the shutter until the exposed film is wound up.

As mentioned above, the bellcrank lever 35 is rocked during the initial winding of the film, and the rocking will serve to withdraw the lug 49 out of the path of lug 66. If it were not for the lug 64 the shutter trigger 59 would then be free and could be actuated before the previously exposed image area is completely wound up, the disadvantages of which are deemed apparent. In order to eliminate any such possibility, the arm 25 is also provided with a lug 64 which is positioned in the path of lug 66 of the shutter trigger. It will be remembered that even though the bellcrank 35 is rocked during the initial winding of the film, the bellcrank 23 remains stationary until slot 20 finally registers with lug 29, at which time the bellcrank 23 is rocked. However, such rocking of the latter bellcrank does not occur until the exposed film has been completely wound. The result is that the lug 64 on arm 25 will not be withdrawn from the path of lug 66 until the winding operation has been completed, so that an unintentional double exposure cannot be made. Thus, the winding mechanism is released when the shutter is actuated and the shutter is locked. The completion of the film winding operation then serves to lock the winding mechanism and free the shutter trigger to permit the next exposure to be made.

The upper or free end of member 20 is provided with a finger actuating portion 67 which extends through a slot, not shown, in the camera body. The position of the portion 67 affords a visual indication of the operation to be performed, as will be presently described. For example, when the portion 67 is in the left-hand position, shown in Fig. 3, the pawl 22 is in engagement with the ratchet 17 and the film winding mechanism is locked. However, the shutter is released and an exposure may be made. Accordingly, the position of member 20 in Fig. 3 may be designated as the "take" position. However, after an exposure has been made, the member 20 and portion 67 are moved to the intermediate position, shown in Fig. 2, to release the winding mechanism to permit the film to be wound. In this position the shutter trigger is locked against actuation. Thus, the position of the member 20 in Fig. 2 may be designated as the "wind" position.

While the above-described mechanism will prevent the making of an unintentional double exposure, there may be occasions when an intentional double exposure will be desirable. It will be remembered that ordinarily after an exposure is made the shutter is locked and the film winding mechanism is free, and the parts are in the position shown in Fig. 1. However, in order to make an intentional double exposure the shutter must be released a second time without winding the film. In other words, the parts must be moved from the position shown in Fig. 1 to that shown in Fig. 3 but without winding, so as to permit release of the shutter. To secure this result, the member 20 and portion 67 are moved to their extreme rightward position, as shown in Fig. 4. In this position a lug 27 on member 20 slides over and engages behind and offset portion 69 formed on cantilever spring 70 anchored to body 11 by screws 71 or other suitably fashioned means. When the member 20 is moved to the position shown in Fig. 4, it will be rocked in a clockwise direction about its pivot 21. Such movement will bring a finger 72 on member 20 into engagement with an ear 73 formed on arm 36 of bellcrank 35 to rock the latter in a counter-clockwise direction about its pivot 24 to move lug 38 out of blocking relation with lug 37 to free the bellcrank 23. The latter will now rock in a counter-clockwise direction to position the lug 29 in the slot 19, the latter not having been moved. The bellcranks 23 and 35 are then in the position shown in Fig. 3, and both lugs 64 and 49 will be withdrawn from the path of the lug 66, and the shutter trigger will be free and a second exposure may be made. It must be remembered that this second actuation of the trigger has been made without winding the film, so that an intentional double exposure has been produced. After this second actuation of the shutter, the parts return automatically to the position shown in Fig. 1 in which the shutter is locked and the winding mechanism is freed. The double exposure image area may now be wound up and the alternative winding and exposing sequence may be continued.

During the winding of the leader and trailer strips of a roll of film, it is desirable to render the locking means for the film winding mechanism inoperative, so as to permit uninterrupted winding of the trailer and leader strips. To secure this result, the member 20 is moved to the position shown in Fig. 4 and is retained in this position by means of spring 70 to hold pawl 22 out of engagement with ratchet 17 as above described. As the ratchet is now free, the spindle 16 may be rotated to wind up the trailer and leader strips. During this winding the finger portion 67 is in the position shown in Fig. 4, and this position may accordingly be designated as the "loading" position. If desired, the designation of "take," "wind" and "load" may be marked on the camera body adjacent the slot therein through which the finger portion 67 projects.

As is apparent, after the trailer strip has been wound off and the leader strip wound so as to bring the numeral "1" on the film backing in the proper position, it is necessary that the locking mechanism be in proper phased relation. Otherwise the film locking will not be in proper sequence. It will be remembered, from the above description, that member 20 has been moved to the "loading" position shown in Fig. 4 during the winding of the leader and trailer strips. When the member 20 has been moved to this position, the lug 29 has been moved into notch 19 of cam 18 to hold the cam 18 against rotation. Now, as the spindle 16 is rotated to wind up the trailer and leader strips, the shaft 14 is held stationary and the film merely slides thereover, and the cams 18 and 41 and the two bellcranks 23 and 35 remain in the position shown in Fig. 3, the member 20, however, being held in the position illustrated in Fig. 4. However, when the leader strip has been wound and the first image area has been moved into position, the portion 67 is grasped by the finger and released from its holding spring 70. The tensioned spring 43 then serves to move member 20 automatically to the position shown in Fig. 3 to engage pawl 22 with ratchet 17 to lock the winding mechanism. However, as the other members have been held stationary during the winding of the trailer and leader strips, the parts have been maintained in proper phased relation so that the film winding and film locking may be performed in proper sequence, and in proper relation to the movement of the film strips, the advantages of which are deemed apparent. Thus, the leader and trailer strips may be wound without in any way disturbing or altering the proper phased relation of the locking mechanism. Then, when the first image area is in position, the parts are in their proper relation to secure the desired results.

The present invention thus provides a double exposure mechanism to prevent the making of an unintentional double exposure or the winding up of an unexposed area. However, a deliberate double exposure may be easily and quickly made when desired, and, when made, the parts are returned to their proper position. The film locking mechanism is released during the winding of the trailer and leader strips; and, after such winding, the parts are properly positioned. During the winding of the trailer and leader strips the various control members are maintained in their proper phased relation.

While one embodiment of the invention has been disclosed, it is to be understood that the inventive idea may be carried out in a number of ways. This application is, therefore, not to be limited to the precise details described, but is intended to cover all variations and modifications thereof, which fall within the scope of the appended claim.

What I claim and desire to secure by Letters Patent of the United States is:

In a roll film camera, the combination with a body portion, a film winding mechanism carried by said portion to move and wind up film, a member pivoted on said portion, a pawl carried by said member and adapted to be moved into engagement with said mechanism to lock the latter against movement, a bellcrank lever pivoted on said portion, an arm of said bellcrank positioned in the path of said member to hold the latter, a film measuring shaft, a cam carried by said shaft and moved in timed relation to the movement of said film, a second arm formed on said bellcrank and engaging said cam to render the latter effective to move said first arm out of holding relation with said member at the end of the film winding operation to free said member, a second bellcrank pivoted on said portion, an arm on said second bellcrank formed with a portion positioned to engage said first arm of said first bellcrank to hold the second arm of the latter out of engagement with said cam, a spring for moving said second bellcrank into holding relation with said first bellcrank, a second cam carried by said shaft, a cam follower formed on said second bellcrank and engaging said second cam so that the initial winding of said film will cause said second cam to rock said second bellcrank to move the arm of said second bellcrank out of holding relation with said first arm of said first bellcrank to free the latter to allow the first arm thereof to engage said first cam so that said winding mechanism will be locked at the end of the film winding operation, a pivoted holding member arranged to engage and hold said second bellcrank out of holding relation with said first bellcrank, a shutter, a trigger for actuating said shutter, means on said shutter for rocking said holding member out of holding relation with said second bellcrank when said shutter is actuated to release said second bellcrank, means for moving said second bellcrank to engage the first arm of said first bellcrank to cause the latter arm to engage said member to move the latter out of holding relation with said mechanism to free the latter, said last movement of said first bellcrank serving to move the second arm out of engagement with said first cam, and means on at least one of said bellcranks positioned in the path of said trigger to prevent a second actuation thereof until the film is wound.

ROBERT F. BLATTNER.

References Cited in the file of this patent

UNITED STATES PATENTS

| Number | Name | Date |
|---|---|---|
| 2,148,636 | Muller et al. | Feb. 28, 1939 |